Patented Oct. 17, 1939

2,176,597

UNITED STATES PATENT OFFICE 2,176,597

METHOD OF USING METALLIC PAINT

Harry A. Sweeney and Leo D. Pangborn, Chicago, Ill., assignors to National Copper Paint Company, Chicago, Ill., a corporation of Illinois No Drawing. Application August 28, 1935, Serial No. 38,217

1 Claim. (Cl. 91—68)

Our invention relates to metallic paint, preferably paint containing amorphous copper as a pigment and to a process whereby such paint may be applied to metallic and other surfaces resulting in the formation of a continuous metallic paint coating whereby there is actually formed a thin continuous metal film over the material protected by the paint. In order to accomplish this, a special type of paint is preferably used and that paint is preferably used with a special type of primer coating which is applied before the paint and which has a number of different and important functions.

In carrying out our process the surface to be coated is first cleaned in the ordinary manner as surfaces are cleaned before painting. Then a primer is applied. The formula for this primer is two and one-half pounds of Electro-Silicon, silicon being the product of the electric treatment of silicon in an oven at a temperature of approximately 3700 degrees F. To this silicon is added six ounces of C. F. 110 celite which is a flatting agent whose purpose is to give bulk so that the Electro-Silicon will settle over the surface. To this is added 108 ounces V. 102 varnish. This varnish is peculiar in that it has a high absorptive factor for hydrogen and absorbs excess hydrogen from the Electro-Silicon. To this is added twenty-three ounces of light naphtha as a solvent and two ounces of "Dipentine", which prevents skinning of the paint. In other words is an anti-coagulant. To this is added one ounce Harshaw drier which comprises two percent cobalt and twenty percent lead in suspension in a carrier of naphtha or naphtha-like solvent. The surface is coated with one or more coats of this primer.

This primer is thin, has a high affinity for metal, makes a tough continuous coating on the metal surface, neutralizes the oxides and hydroxides which may have been formed on the surface by the action of the atmosphere and leaves a chemically clean protected surface. The structural characteristics of the elements of the primer are such that as this primer dries a microscopically roughened surface results with tooth-like projections which serves to anchor and immobilize the subsequently applied coating surface.

Thereafter copper paint is applied to the primed surface. This copper paint comprises four pounds amorphous copper pigment and it is essential that this pigment be entirely amorphous. The presence of any crystalline copper in the paint is highly undesirable because as will hereinafter appear, crystalline copper has a totally different action and effect from amorphous copper. This copper pigment is added to one gallon of 215A varnish, which is a standard commercial varnish and other suitable varnishes may be used. To this is added two ounces calcium linoleate which is a suspension agent tending to keep the copper from settling. This has added to it four ounces Harshaw drier, which is two percent cobalt, twenty percent lead in suspension in a carrier of naphtha or naphtha-like solvent. The Harshaw drier is the same as that used as above referred to in the primer.

The varnish must be an alkaline varnish sufficient to neutralize the slight acidity of the copper pigment. The calcium linoleate serves as a suspension agent and is different from most suspension agents used in the paint industry which tend to precipitate the metallic pigment. This also is true of the drier, as the drier most ordinarily used is manganese. Manganese is not satisfactory in this connection because it tends to precipitate out and tends to cause the paint to wrinkle.

When this copper paint is applied to the primed surface, the microscopic roughness of the primer coat tends to anchor the copper and carrier in place and prevents streaking and flowing and stripping and holds the copper paint and carrier in place while drying takes place. The main coating of copper paint tends to dissolve the primer so that when the paint is finally hardened, the primer is more or less absorbed into the mass and there is a continuous homogeneous copper or pigment film over the surface. The reason why it is important to use amorphous copper is that the amorphous copper particles tend to cement or weld themselves together to make a continuous copper coating. Outside this copper coating is a separate protecting coating of the carrier which is in general similar to the well-known synthetic resins so that when the outer coat is worn away, there still remains the continuous copper coating. This is, of course, radically different from normal metallic paints because ordinarily the metal is held on the surface by the carrier and if the carrier disappears, the metal goes with it. In this case, because of the use of amorphous copper, the amorphous particles interlace and interlock and hold themselves together upon the surface whether the carrier disappears or not and it is this characteristic of amorphous copper differing from crystalline copper which is so important. Crystalline copper being of fixed shape, leaves voids between the individual copper particles whereas the amorphous copper being irregular in shape mats together felt-wise so as to form a continuous non-porous surface.

Another important reason for the use of exclusively amorphous copper is that amorphous copper is at least twenty-five percent greater by volume per unit weight than crystalline copper and there is just that much more wetted surface available on the copper to promote satisfactory mixing and suspension and to promote satisfactory adhesion of the copper particles together and to the surface and of course the presence of occasional particles of crystalline copper would break down the film and give an undesired result. The voids between crystalline copper particles serve as reservoirs to contain oxygen and serve as nucleii from which oxidation and corrosion start and thereby the film is weakened and that is another reason for the importance of the use of amorphous copper. Amorphous copper joining particle to particle in a kind of conglomerate so that voids are entirely prevented or at least minimized gives this important improved result.

We claim:

The process of coating metallic surfaces which consists in applying to the surface a primer which includes in its composition silicon which has been treated in an oven at a temperature of 3700 degrees Fahr., a flatting agent adapted to give bulk so that the silicon will settle over the surface and a varnish having a high absorptive factor for hydrogen and adapted to absorb excess hydrogen from the silicon, together with light naphtha as a solvent and a small quantity of an anti-coagulant, then causing the primer to dry with resultant microscopically roughened tooth-like projections on the primer surface, then applying to the surface a copper paint, the copper in which is exclusively amorphous suspended in a varnish and calcium linoleate as a suspension agent tending to keep the copper from settling plus a dryer including cobalt, lead and an inorganic hydro-carbon solvent.

HARRY A. SWEENEY.
LEO D. PANGBORN.